INVENTORS
GENE HIRS
BY ALFRED H. STEIN

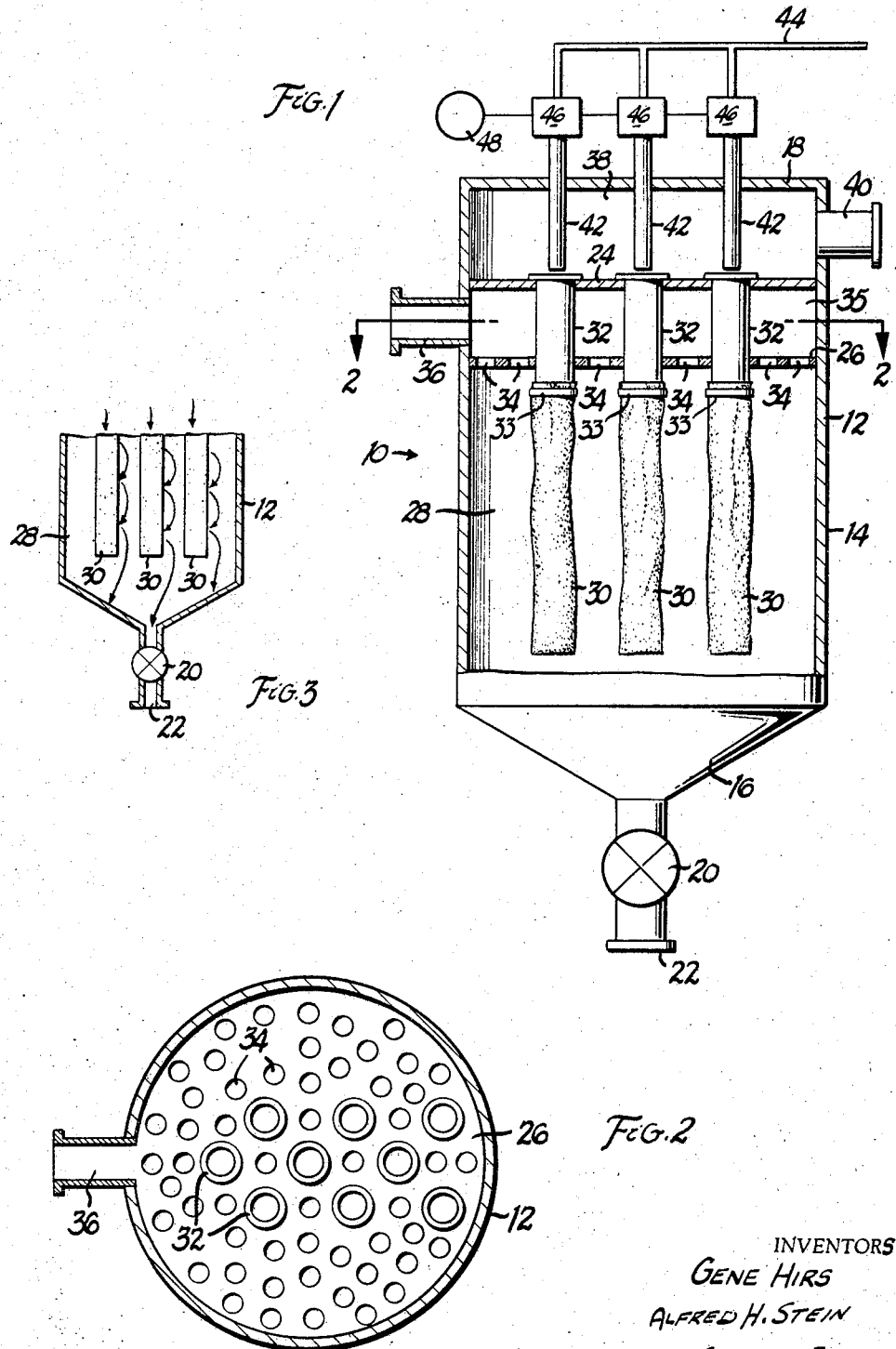
Nov. 25, 1969 — G. HIRS ET AL — 3,480,330
DUST COLLECTOR
Filed Feb. 8, 1967 — 4 Sheets-Sheet 1
INVENTORS
GENE HIRS
ALFRED H. STEIN
WILSON, SETTLE, BATCHELDER & CRAIG
ATT'YS.

WILSON, SETTLE, BATCHELDER
ATT'YS. & CRAIG.

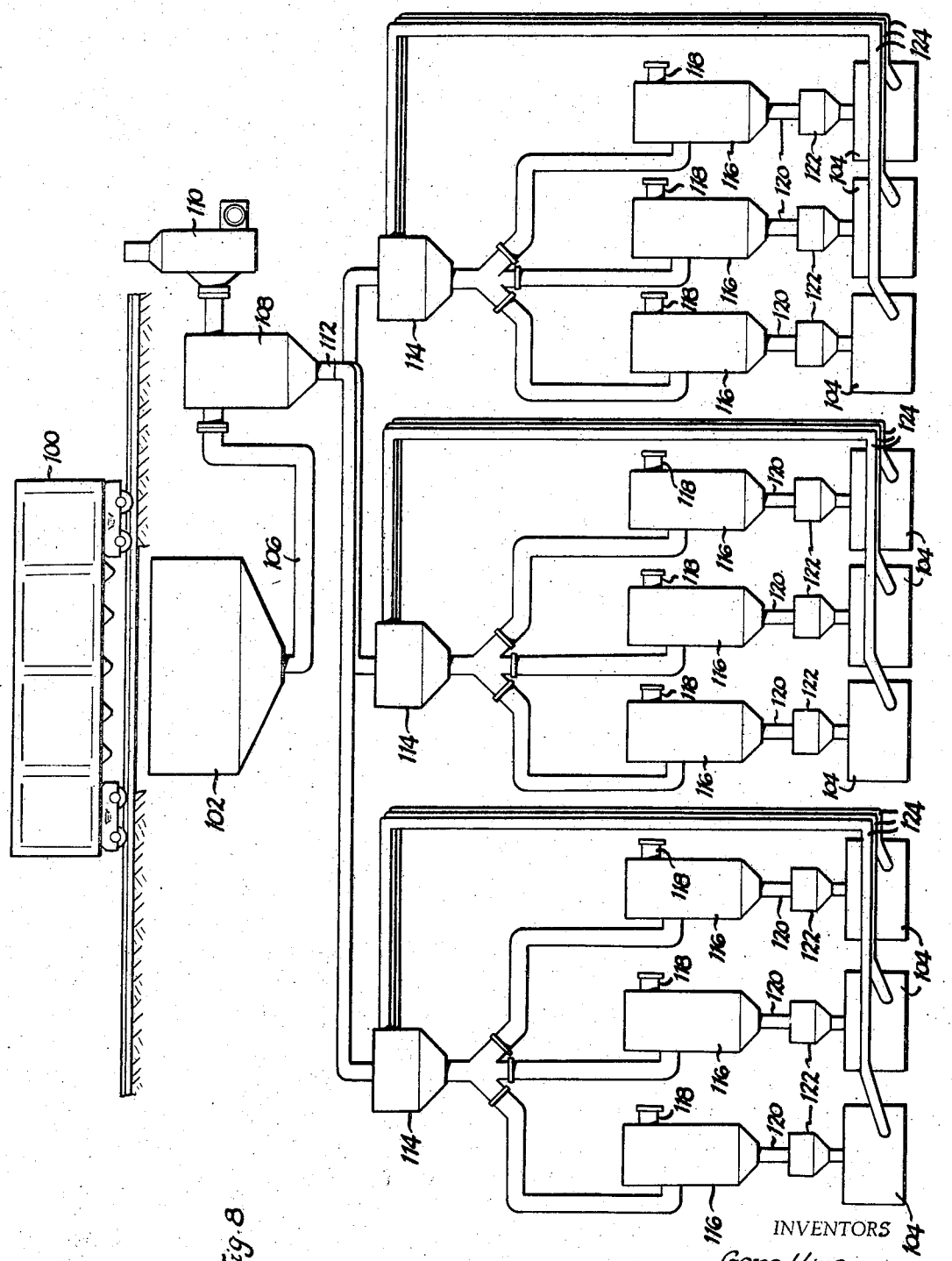

3,480,330
DUST COLLECTOR
Gene Hirs, Birmingham, and Alfred H. Stein, Southfield, Mich., assignors to Hydromation Engineering Company, Livonia, Mich.
Continuation-in-part of application Ser. No. 542,546, Apr. 14, 1966. This application Feb. 8, 1967, Ser. No. 621,094
Int. Cl. B65g 53/04; B01d 46/02
U.S. Cl. 302—28          4 Claims

ABSTRACT OF THE DISCLOSURE

A dust collector of the dry bag type is provided in which dust laden gas flows downwardly over air permeable filter tubes, with the gas only flowing into the tubes and upwardly to a discharge point. Dust deposits on the exterior of the tubes and is periodically blasted off by exploding the tubes with compressed air. The dust settles to a lower discharge point, and this setting is aided by the downward flow of gas over the filter tubes so that both fine and coarser particles settle to the discharge point without substantially altering the distribution of particle sizes. Because this distribution remains unchanged, the dust collector can be used as part of a system for bulk handling and conveying of powder material wherein powder discharged from one dust collector can be passed through another dust collector without altering the distribution of particle sizes. In a spray coating application, powder is passed through a dust collector and is fed to spray coating apparatus. Excess or overspray powder is returned to the inlet of the dust collector to be passed through the system again.

Background of the invention

Figure 4:
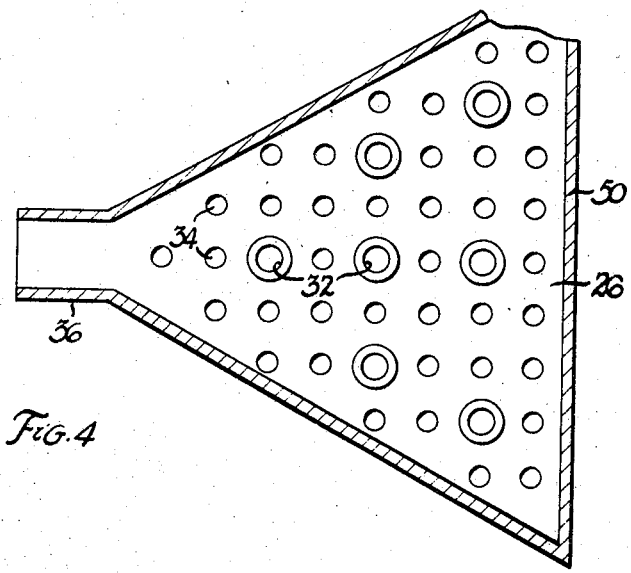

This application is a continuation-in-part of a copending application of Gene Hirs and Alfred H. Stein, Ser. No. 542,546, filed Apr. 14, 1966, now abandoned, and assigned to the same assignee as this application.

This invention relates to dust collectors and methods of filtering dust laden gas. In particular, the invention relates to a method of and apparatus for filtering dust laden air characterized by downwardly flowing dust laden air in peripheral contact with an air permeable filter tube of the dry bag type, passing the air only through the tube and then flowing clean air upwardly to a discharge point, so that the flow of dust laden air aids in the gravitational settling of dust from the tubes to a lower discharge point even while the tubes are being periodically cleaned. The invention further relates to pneumatic conveying systems wherein the dust discharged from one dust collector can be processed through another dust collector without altering the distribution of particle sizes in the dust, and to systems wherein powdered coating material is processed through a dust collector and fed from there to spray powder coating apparatus from which excess powder is returned to the inlet of the dust collector.

One of the known ways of filtering dust laden air is to pass the air through filter tubes of porous, air permeable material suspended in a dust collector housing. A coating of dust builds up on one surface of the filter tubes, either the inside surface or the outside surface depending on which way the dust laden air flows through the tubes, and this dust coating in itself acts as a filter media which aids the porous tubes in filtering the later introduced air. To prevent too much dust from building up on the tubes, air may periodically be blown in the reverse direction through the tubes and this reverse flow releases dust from the tubes, so that it can settle gravitationally to a dust discharging point. If the incoming flow of dust laden air includes a component which flows upwardly over the filter tubes, this component opposes the settling of dust to the lower end of the housing and tends to redeposit dust on the tubes near or even above the point where it was released during cleaning. In known dust collectors there is such an upward flow of air which opposes settling of dust. In many cases, the incoming dust laden air enters the dust collector at a point below the filter tubes and flows upward over the tubes. In other cases air entering at an elevated point is diverted downward before it reaches the filter tubes and then flows upward over and through the tubes.

Summary of the invention

In accordance with the present invention, a dust collector and filtering method are provided wherein incoming dust laden air enters the filtering space at a point above the upper extremity of the air-permeable filter tubes and flows downwardly over the filter tubes, through the porous material of the tubes and out from the interior of the tubes to a discharge point. By bringing dust laden air n at the top of the filtering space and traversing the air downwardly over the tubes, the component of force that tends to move dust after it is released from the tubes is always downward, and the farther the dust gets down a given tube, the less velocity of incoming air there is to entrap dust and put it back on the tubes. Dust is released from the tubes by abruptly inflating them using blasts of compressed air supplied from nozzles which may be located above the upper ends of the filter tubes. By virtue of the downward flow of dirty air over the filter tubes combined with pulsing of the tubes with blasts of air, the filter tubes may be made two or three times longer than is possible with systems wherein the dust laden gas flows upward over the tubes. This increases the capacity of the dust collector. It is also possible to obtain a greater flow in cubic feet per minute of dust laden air per square foot of filter area; that is a greater air-to-cloth ratio is obtained. Also, the dust collector of the invention can handle a higher concentration of dust in the dirty air than previous designs.

It has been found that the dust collector of the invention is useful in conveying and bulk handling of powders. For such applications, a collector must be used which does not alter the distribution of particle sizes in the powder. In particular, the ratio of fines to larger particles must be the same in the powder discharged from the collector as in the powder originally fed into the collector. In dust collectors having an upward flow of gas over the exterior of the filter tubes the upward flow tends to hold back fines until they agglomerate into larger particles which then settle out. In the collector of the invention, the downward flow of gas over the filter tubes helps the fines as well as larger particles to settle out so that the ratio of fines to larger particles is the same in the outgoing powder as in the incoming powder. Thus, the dust collector of the invention is well suited to bulk handling and conveying application. The collector can also be used in connection with automatic unloading of containers of powder and in dry spray powder coating applications where it is important for the powder returned to the system from the collector to have the same content of fines as the powder fed into the collector.

Accordingly, it is an object of the present invention to provide a method of and apparatus for filtering dust laden gas wherein the settling of dust released from filter tubes is aided by the flow of incoming dust laden gas.

Another object of the invention is to provide a dust collector and a filtering method characterized by a downward flow of dust laden gas over filter tubes of the apparatus so that the force acting on dust which is released from the tubes by pulsing them is always downward, thus aiding the dust to settle out at a discharge point.

A further object of the invention is to provide a dust collector and a method of filtering dust laden gas wherein by flowing the gas downward over filter tubes the velocity of the gas decreases progressively toward the bottom of the filter tubes such that the gas velocity at the bottom of the tubes approaches zero, thus achieving optimum conditions for the gravitational settling of dust for eventual removal.

Another object of the invention is to provide a dust collector and a method of filtering dust laden gas which are well suited to bulk handling, conveying and dry powder spray coating applications.

A further object is to provide a dust collector and method of filtering dust laden gas which will process powder material through the dust collector without substantially altering the distribution of particle sizes in the powder.

Other objects of this invention will appear in the following description and appended claims, reference being had to the accompanying drawings forming a part of this specification wherein like reference characters designate corresponding parts in the several views.

On the drawings:

FIGURE 1 is a schematic sectional view of a dust collector in accordance with the invention;

FIGURE 2 is a sectional view taken on line 2—2 of FIGURE 1;

FIGURE 3 is a fragmentary sectional view illustrating how dust settles in steps as it is released from filter tubes periodically;

FIGURE 4 is a sectional view similar to FIGURE 2, but showing an embodiment in which the housing is triangular;

FIGURE 5 is a sectional view of an embodiment in which the housing is rectangular;

FIGURE 6 is a fragmentary elevational view of the embodiment of FIGURE 5;

FIGURE 7 is a schematic sectional view of a dust collector forming another embodiment of the invention; and FIGURE 8 is a schematic diagram of a conveying and spray coating system in accordance with the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings, referring first to FIGURE 1, the dust collector 10 shown there includes a housing 12 which has a side wall 14, a bottom wall 16 and a top wall 18. The bottom wall 16 is in the form of a hopper in which dust settles for discharge through an air lock 20. Dust and dirt are removed from the housing 12 from the dust discharge outlet 22.

Within the housing 12 there are two transverse walls 24 and 26 which serve to define chambers within the housing. The space between transverse wall 26 and the bottom wall 16 of the housing 12 is the filtering space 28 of the apparatus. A plurality of filter tubes 30 of the dry bag type are suspended in this filtering space with their axes extending vertically and parallel to each other. The filter tubes 30 are clamped at their top ends with clamps 33 to conduits 32 which are attached to the upper transverse wall 24 and extend through openings in the other transverse wall 26 to a point within the filtering space 28. The filter tubes are made of a porous material such as felt, suitable for filtering dust laden gas to remove dust from the gas and deposit such dust on the exterior of the filter tubes. The conduits 32 are made of metal and so will withstand the wearing action of the incoming dirty air. If that air were blown directly on the felt filter tubes it would wear the material of the tubes.

Between the two transverse walls 24 and 26 there is an intermediate plenum 35 which serves as an inlet passage for dust laden air. There are a plurality of openings 34 through the transverse wall 26 via which dust laden gas flows from the inlet passage 35 into the filtering space 28. An inlet 36 extends through the housing 12, and incoming dust laden gas enters the housing and the intermediate inlet plenum 35 through the inlet 36.

The space between the upper transverse wall 24 and the top wall 18 of the housing serves as an outlet passage or plenum through which air leaving the filter tubes 30 flows on its way to an outlet 40 via which gas leaves the housing 12. Thus, the outlet plenum 38 is above the inlet plenum 35, and the inlet plenum in turn is above the filtering space 28. A suction fan is provided in a space communicating with outlet 40 to produce a flow of gas into inlet 36, through tubes 30 and out of outlet 40. A pressure fan could alternatively be provided in a space communicating with inlet 36 but it would be subjected to the wearing action of the dust laden air.

In the outlet plenum 38, there are a plurality of nozzles 42 which are connected to a compressed air line 44. In series with each of the nozzles 42 is a solenoid-operated valve 46, and the valves are actuated by a timer 48, the connection between the timer and the valves 46 being indicated schematically. When the valves 46 are actuated, a blast of high velocity air is directed from each of the nozzles 42 into the filter tubes 30 so as to inflate momentarily or "explode" each of the filter tubes to thereby release dust from the outside of the filter tubes. This released dust then settles toward the bottom of the housing where it is ultimately discharged through the air lock 20.

In the operation of the dust collector, dust laden gas, ordinarily air, enters the housing 20 through the inlet 36 and flows into the inlet plenum 35. From there, the dust laden air flows through openings 34 in transverse wall 26 to the filtering space 28 wherein the dust laden air flows downwardly over the exterior surfaces of the filter tubes 30. The air flows through the porous material of the filter tubes into the inside thereof and then clean air flows upward through the filter tubes and through the conduits 32 to the upper plenum 38 from which the air exits via the outlet 40. As the dust laden air passes through the porous material of the tubes 30, dust is deposited on the exterior surface of the tubes. A coating of dust builds up on these exterior tube surfaces, and as previously mentioned, the dust coating acts as a filter media which aids the porous material in filtering dust out of the air passing through it.

In order to prevent too much dust from building up on the filter tubes 30, the filter tubes are periodically abruptly inflated or exploded, either together or sequentially, so as to release dust from the outside of the filter tubes. In the illustrated embodiment, the timer 48 actuates the solenoid-operated valves 46 to cause blasts of compressed air to issue from the nozzles 42 in a predetermined sequence. These blasts of air are directed through the conduits 32 and from there into the filter tubes 30. Dust which is released from the filter tubes 30 in this manner tends to settle towards the bottom of the collector housing 12, and the only force other than gravity tending to move the dust as it settles is the downward force which results from the downward flow of dust laden gas over the filter tubes 30.

FIGURE 3 shows how this downward flow helps to settle the dust out at the bottom of the housing. As indicated in FIGURE 3 by the arrows, dust which is released from the filter tubes may redeposit on the tubes before reaching the bottom of the tubes. The next time the filter tube is pulsed or exploded, dust is again released from the outside of the tube and flows a step closer to the bottom of the tubes. Thus, the dust works its way down the tubes step-by-step until it passes the bottom ends of the tubes and settles from there to the dust discharging outlet at the bottom of the housing 12. This settling process of the dust is aided by the downward flow of the dust laden gas over the filter tubes.

As the air flows downward through the filtering space 28, its velocity decreases progressing downwardly along the tubes because some of the air is always flowing into the tubes through the porous material thereof. Thus, the farther the dust gets down on a given filter tube, the less velocity there is to pick up the dust and put it back on the tube. The air velocity at the bottom of the tube is, theoretically, zero, so once the dust reaches the bottom of the tube it settles freely by gravity toward the air lock 20 at the bottom of the housing 12.

Dust which has collected on the exterior surface of the filter tubes 30 tends to agglomerate into larger particles. These particles are blown off the filter tubes when they are exploded during the cleaning cycle, and these particles settle more readily than the finer dust particles in the incoming air. In apparatus of the prior art wherein there is an upward component of flow over the filter tubes, a substantial degree of agglomeration is needed in order for the dust to settle. In the apparatus of the invention where settling of dust is aided by downward flow of gas, less agglomeration is needed to get settling and there is less tendency for dirt to redeposit on the filter tubes after it has been blown off of the tubes.

It is desirable to obtain an even distribution of dust laden air through the inlet plenum 35 and flowing into the filter space 28. This may be accomplished by the use of staggered inlet openings, or by means of baffles or plural inlets distributed around the housing 12. In the embodiment illustrated in FIGURE 4, an even distribution of air is obtained by making the housing 50 and wall 26 triangular and by having the openings 34 in the transverse wall 26 arranged in a pattern. It may be seen that the number of openings 34 increases progressively with distance from the inlet 36. This assures that the incoming air does not all flow through the openings closest to the inlet 36 and results in a uniform distribution of the inlet air to the filtering space 28.

Figure 5:
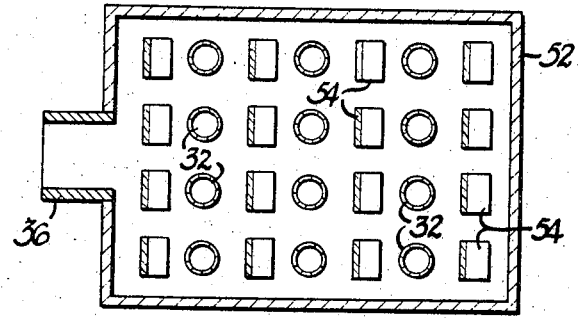
Figure 6:
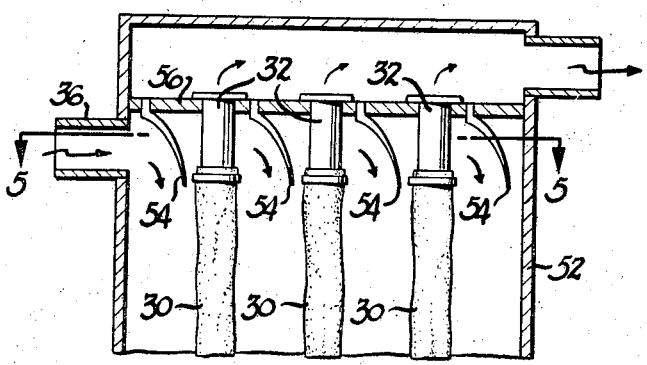

FIGURES 5 and 6 illustrate another embodiment wherein the housing 52 has a square configuration and baffles 54 are provided in the housing to distribute incoming air more or less uniformly to the filtering space. In this embodiment there is no transverse wall equivalent to wall 26 of FIGURE 1. The inlet passage is the space immediately under a wall 56 like wall 24 in FIGURE 1 where the conduits 32 are located.

Figure 7:
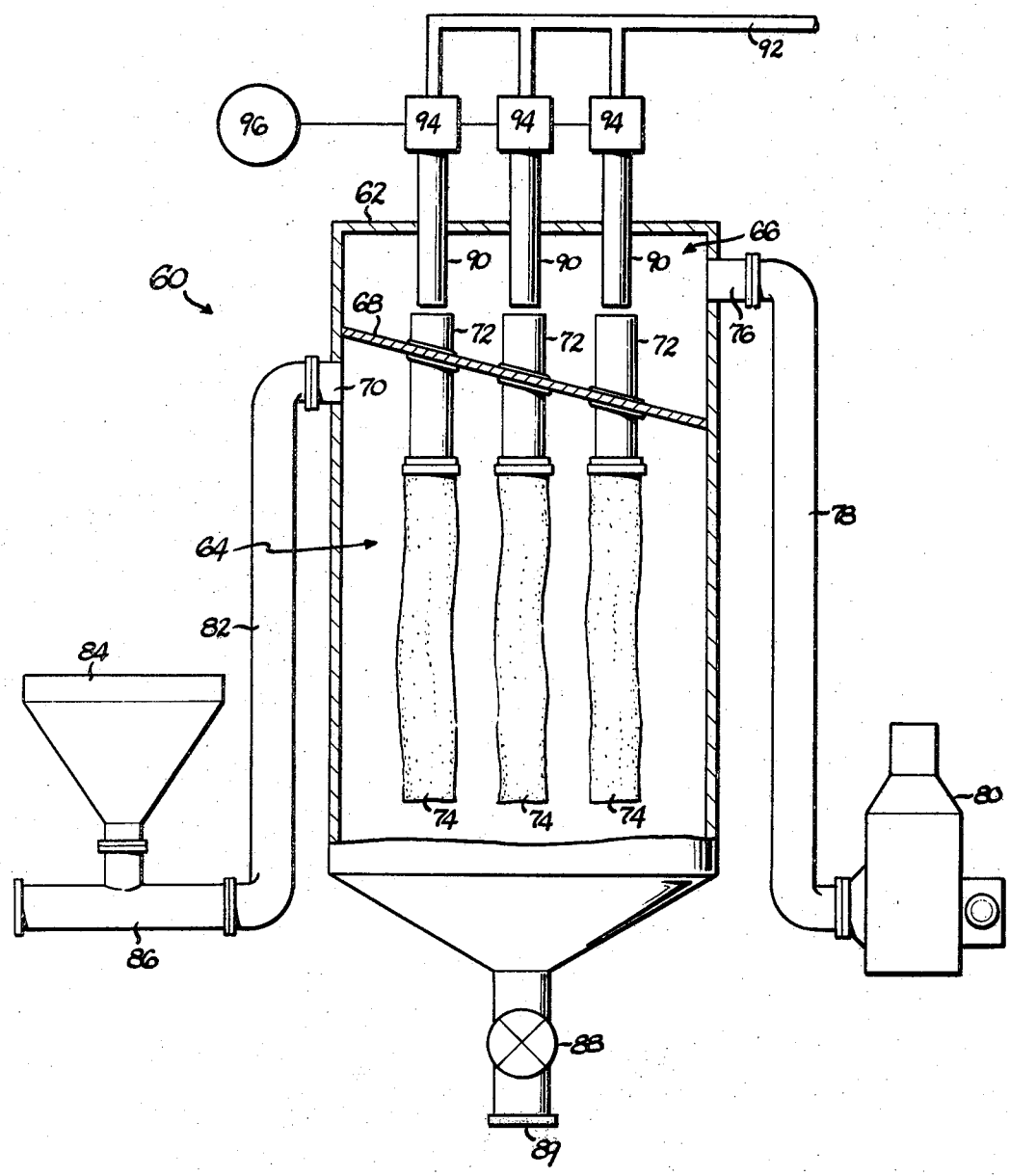

Another embodiment of the invention is shown in FIGURE 7. The dust collector 60 includes a housing 62 which is divided into a filtering space 64 and an outlet space 66 by a wall 68. The wall 68 is located just above an inlet 70 and it slants downward to the right as viewed in FIGURE 7 so that dust laden air entering the housing through inlet 70 is directed downwardly into the filtering space 64 by the wall 68. A plurality of metal conduits 72 extend through wall 68, and dry bag filter tubes 74 are clamped at their top ends to the conduits 72 so that the filter tubes 74 are suspended with their axes extending vertically and parallel to each other. As previously explained, the filter tubes are made of felt or other porous material suitable for removing dust or powder from the incoming air. The conduits 72 are located opposite the inlet 70 and, being made of metal, will withsand the wearing action of the incoming air and particles.

Air leaves the housing 62 through an outlet 76 which communicates with the outlet passage 66. A pipe 78 is connected to outlet 76 and leads to a suction fan 80 which serves to draw air in through the inlet 70, down over filter tubes 74, through the filter tubes into outlet passage 66 and out through outlet 76. Another pipe 82 is connected to inlet 70 and leads to a hopper 84 which feeds powder or other dust material into the system. This powder is carried by air flowing through pipes 86 and 82 to the inlet 70 and ultimately is discharged from an air lock 88 provided at the bottom of the dust collector.

In the outlet passage 66, there are a plurality of nozzles 90 which extend through the top of housing 62 and are connected to a compressed air line 92. A solenoid operated valve 94 is provided in series with each of the nozzles, and these valves are actuated by a timer 96. The nozzles 90 serve to direct blasts of air into the filter tubes 74 so as to inflate and momentarily "explode" the tubes as previously explained.

The operation of the dust collector of FIGURES 7 is the same as has been described in connection with FIGURE 1, and this description will not be repeated. It is important to note, however, that the downward flow of dust laden air over the filter tubes 74 aids the gravitional settling of the dust or powder towards the dust discharging outlet 89. It has been mentioned that fines which have collected on the exterior surface of the filter tubes tends to agglomerate into larger particles. However, there is much less agglomeration of dust in connection with the duct collector of the invention as compared with prior art dust collectors wherein there is an upward component of flow over the filter tubes. As a result, the distribution of particle sizes in the dust which is discharged from outlet 89 is substantially the same as that in the dust in the hopper 84; the dust passes through the dust collector without any substantial alteration of its distribution of particle sizes.

FIGURE 8 shows a system wherein the constant particle size distribution characteristic of the present dust collectors is a distinct advantage. FIGURE 8 shows a railroad car 100 unloading a dry powder such as epoxy resin powder into a main hopper 102. The epoxy powder is ultimately to be fed to spray coating units 104 which spray the powder onto heated objects to be coated. The function of the system of FIGURE 8 is to deliver the dust from car 100 to the spray coating units 104 without losing the fines and generally without altering the distribution of particle sizes to a substantial degree.

From the hopper 102, the powder is fed into an intake pipe 106 leading to a dust collector 108 which has an associated suction fan 110 for drawing the air and particles into and through the dust collector. The powder is collected in the dust collector 108 and is discharged from its outlet 112 into three secondary hoppers 114. Each of the secondary hoppers feeds powder to three more dust collectors 116, each of which is provided with a suction fan (not shown) at its air outlet 118 for drawing an air and powder mixture into the dust collector. The powder is discharged from dust collectors 116 through dust discharging outlets 120 which lead into hoppers 122 for the spray coating units 104. The powder is sprayed by the latter units on to objects to be coated, but some of the spray does not deposit on the objects. This blow-by spray is collected and fed through pipes 124 back to the hoppers 114 from which it will be recycled through the system. It will be understood that appropriate fans will be provided for establishing flow of air and powder in the various pipes of the system.

Thus, the invention provides a method of and apparatus for filtering dust laden gases which is characterized by a downward flow of dust laden gas over filter tubes provided in a dust collector with the downward gas flow aiding dust to settle to the bottom of the collector. A number of important advantages arise from this downward flow characteristic of the gas. Since the dust has to settle downward, it is important not to have an upward velocity of air passing the bottom of the filter tubes. In the dust collector of the invention, the velocity of gas at the bottom of the tubes approaches zero, and the component of force that acts on the dirt after it is released from tubes is always downward in the direction to aid the settling of dust. This results in a greater air-to-cloth ratio than has been possible with dust collectors of previous designs and it is also possible to filter air having a greater concentration of dust in it. By virtue of these advantages it is possible to provide much longer filter tubes than have been used previously, the tubes being anywhere from six to twenty feet in length as compared to tubes of four to eight feet in length in previous dust collectors.

The invention also provides a pneumatic conveying system capable of automatically unloading large quantities of powder from containers and conveying the powder to utilization apparatus such as spray coating units. By virtue of the unique settling action of the dust collectors of the system, the fine particles are not lost and the ratio of fines to larger particles remains substantially constant.

We claim:

1. A powder handling system including in combination a source of powdered material, a first dust collector comprising means defining a filtering space, a plurality of filter tubes of porous material in said filtering space supported with the axes thereof extending vertically and parallel to each other, casing structure defining an outlet passage communicating with the interior of each of said filter tubes for flow of clean gas leaving said filter tubes from the interior thereof, means connected to said outlet passage for producing a flow of gas through said filtering space and said outlet passage, a dust discharging outlet below the lower extremity of said filter tubes, inlet means communicating with said filter tubes at the upper extremity thereof constructed to provide a flow of powder laden gas through said inlet means and from there downwardly over the exterior of said filter tubes, through the porous material of said tubes while depositing powder on said tubes and out through said outlet passage, a source of powder communicating with said inlet means, and means for periodically flexing said filter tubes to release powder from said tubes to settle to said dust discharging outlet with such settling being aided by the downward flow of gas over said filter tubes, said system further comprising outside of said first dust collector storage means connected to said dust discharging outlet of said first dust collector for temporarily storing powder discharged from said first dust collector, a plurality of second dust collectors each having the same construction as said first dust collector and having the inlet means thereof all connected to said storage means for receiving powder therefrom, the powder leaving the dust discharging outlet of said second dust collectors having substantially the same distribution of particle sizes as the powder fed to said first dust collector, whereby powder can be conveyed by said system without substantially altering the distribution of particle sizes in the powder, a spray coating device communicating with the dust discharging outlet of each of said second dust collectors for spraying the powder on an object to be coated, and return conduit means leading from the spraying area of each of said spray coating devices to said storage means outside of and exclusive of said first dust collector for returning unused powder from said spray coating devices to said storage means without again passing through said first dust collector for recirculation through said second dust collectors and the corresponding spray coating devices.

2. The system as claimed in claim 1 in which said inlet means includes a slanting plate separating said filtering space from said outlet passage, and an inlet passage below said plate, said plate slanting at an angle relative to the horizontal direction for directing incoming powder laden gas downwardly over the exterior of said filter tubes.

3. The system as claimed in claim 1 in which said inlet means includes a horizontal plate separating said filtering space from said outlet passage, an inlet passage below said plate, and baffle means projecting downwardly from said plate opposite said inlet passage for directing powder laden gas downwardly over the exterior of said filter tubes.

4. The system as claimed in claim 1 further including second storage means communicating with said inlet means of said first dust collector and located adjacent a mobile transporter discharge area for receiving powder from a mobile transporter.

References Cited

UNITED STATES PATENTS

| | | | |
|---|---|---|---|
| 601,355 | 3/1898 | Paterson. | |
| 945,632 | 1/1910 | Strahl | 55—498 |
| 2,035,592 | 3/1936 | Christensen | 210—323 |
| 2,255,519 | 9/1941 | Preston | 55—341 X |
| 2,718,207 | 9/1955 | Garrison | 118—312 X |
| 2,770,212 | 11/1956 | Marantz | 118—51 |
| 3,169,109 | 2/1965 | Hirs | 210—456 X |
| 3,176,846 | 4/1965 | Adams | 210—340 X |

FOREIGN PATENTS 992,290    5/1965    Great Britain.

HARRY R. THORNTON, Primary Examiner

D. E. TALBERT, Jr., Assistant Examiner

U.S. Cl. X.R.

55—302, 341, 343, 385, 418, 431, 432; 98—115; 118—312; 210—333; 302—59